Dec. 5, 1950   J. ROBINSON ET AL   2,533,047
POWER TRANSMISSION
Filed Aug. 14, 1946
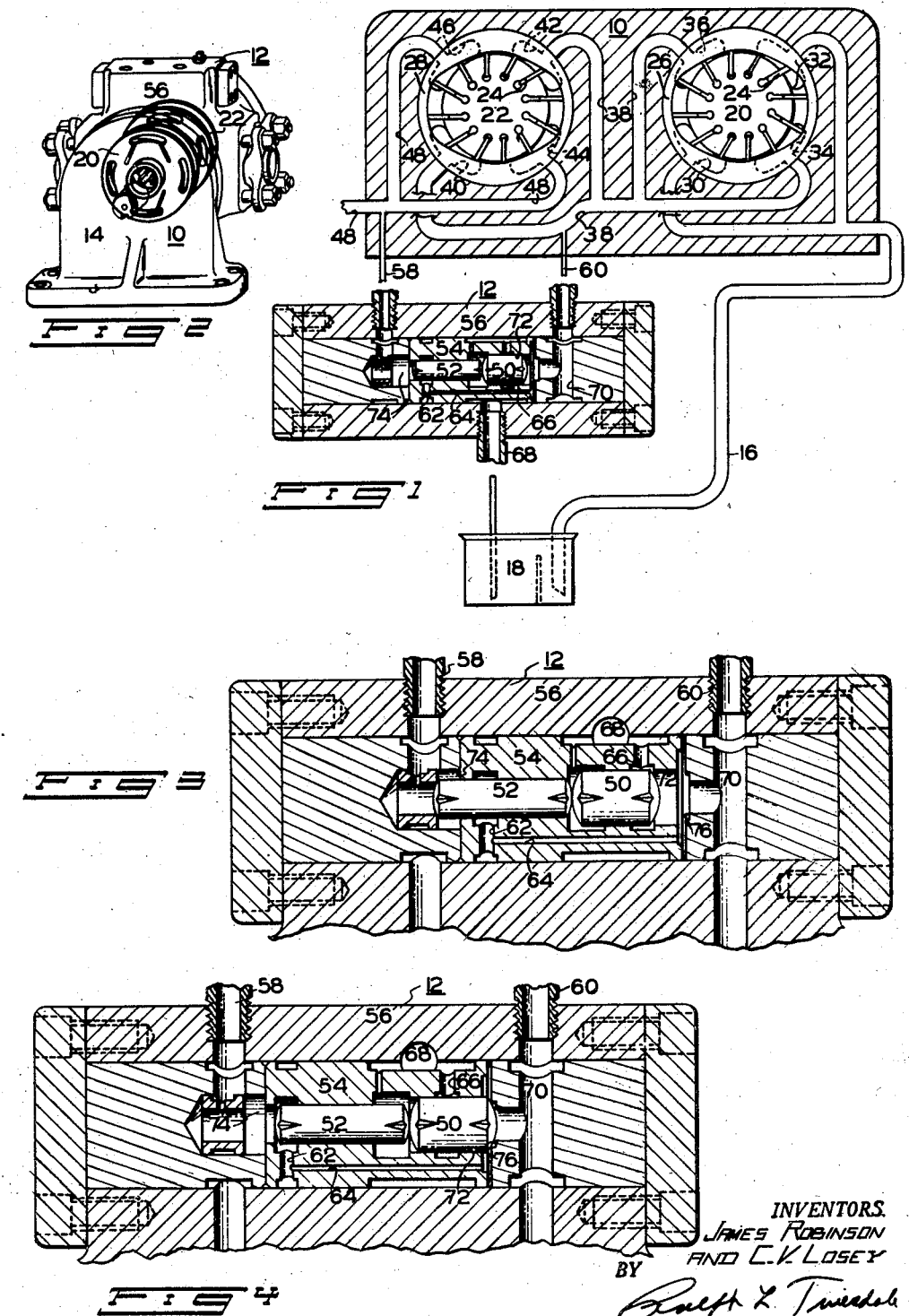
INVENTORS.
JAMES ROBINSON
AND C. V. LOSEY
BY
Rolph L. Tweedale
ATTORNEY Patented Dec. 5, 1950

2,533,047

UNITED STATES PATENT OFFICE 2,533,047

POWER TRANSMISSION

James Robinson, Huntington Woods, and Clifford V. Losey, Ferndale, Mich., assignors to Vickers Incorporated, Detroit, Mich., a corporation of Michigan Application August 14, 1946, Serial No. 690,490

17 Claims. (Cl. 103—11)

1

This invention relates to power transmissions, particularly to those of the type comprising two or more fluid pressure energy translating devices, one of which may function as a pump and another as a fluid motor.

The invention is more particularly concerned with transmissions employing multi-stage pumps or motors or other hydraulic circuits where two or more fluctuating pressure chambers must be maintained in proportionate pressure relationship regardless of changes in any one of the related pressures.

In multi-stage pump or motor circuits it is desirable to increase the pressure through each pump or motor equally in relation and in proportion to the final or discharge pressure as there are pumps or motors in the circuit. For example, in a two-stage pump circuit, if the first-stage pump has greater displacement than the second stage, the first stage will deliver more fluid than the second can handle and consequently the pressure will increase in the intermediate conduit between the pumps until it reaches the discharge pressure. When the above facts are true, the first stage would be carrying all the load and, if the rated pressure were exceeded, it is possible the pump may fail. In the same way the second-stage pump may fail from excessive pressure rise when the second-stage pump displacement exceeds that of the first.

With hydraulic motors, their loads determine the difference in pressure between their inlets and outlets. For example, a single motor subjected to 2,000 pounds per square inch inlet operating pressure and discharging to atmosphere has a 2,000 pound rating. If two such motors were connected in series in the same circuit, theoretically each motor may be of a 1,000 pound rating providing the pressure drop across each motor in the series is maintained at its rating. However, if the first stage motor inadvertently has a greater displacement than the second stage, the pressure in the intermediate conduit might rise to full operating pressure thereby throwing the entire load and pressure drop on the second stage motor and cause overload failure of that motor. On the other hand, if the first stage has a smaller displacement, it may carry the entire load and fail.

The past practice to overcome this difficulty was to purposely make the earlier stage pump or the later stage motor with a greater displacement than the succeeding or preceding stage, respectively, and then bleed off the excess pressure in the intermediate conduit. However, this practice

2 requires different size pumps or motors for each of the stages and, therefore, increases the transmission cost and maintenance problem.

One of the objects of this invention is to provide a transmission adapted to employ multiple pumps or motors of the same displacement and connected in series.

Although several pumps or motors may theoretically be provided with equal displacements, variations in quality of workmanship or wear may change these characteristics as a result the pressures in the intermediate conduit of a series circuit may not be maintained equally. In fact, the pressure in the intermediate conduit may be either too high or too low. In order to control such a result, the pressure dividing valve disclosed herein is proposed.

Its function is to bleed off excessive pressure fluid or introduce higher pressure fluid during subnormal pressures in order to maintain proportionate drops through each pump or motor.

Therefore, one of the objects of this invention is to provide a pressure dividing valve capable of maintaining predetermined pressures of relative proportions in various chambers regardless of pressure fluctuation in any one of the chambers.

To accomplish this purpose, the pressure dividing valve may be equipped with a differential piston, each piston area being in proportion to the related pressure in the chamber it controls.

Therefore, another object is to provide a pressure dividing valve employing a differential piston with areas in the same proportion as the related pressures to be maintained.

The manufacturing operation of boring or broaching differential cylinders within close limit of concentricity is a difficult machining problem. In the proposed design, the differential pistons are not connected and, therefore, the problem of concentricity is eliminated. By locating the differential cylinders in a replaceable sleeve, the operating elements may be readily renewed or replaced by cylinders and pistons of different proportions to accommodate a new set of predetermined pressure conditions. Consequently, a low-cost, highly efficient differential pressure dividing valve has been developed.

Therefore, still another object is to provide a low-cost highly efficient dividing valve equipped with a replaceable packaged differential cylinder and piston.

Another object is to construct a combination multi-stage pump and dividing valve in a single housing unit.

Further objects and advantages of the present invention will be apparent from the following description, reference being had to the accompanying drawing wherein a preferred form of the present invention is clearly shown.

In the drawing:

Figure 1 is a schematic diagram of a two-stage pump and circuit employing a preferred form of the invention.

Figure 2 is a perspective view of the two-stage pump and dividing valve housing showing a phantom view of the pump rotors.

Figures 3 and 4 are enlarged sectional views of the dividing valve in its two open positions.

In detail, the circuit includes a multi-stage pump 10 and dividing valve 12 mounted in a housing 14 and connected by a suction conduit 16 to tank 18. The pump 10 is provided with first and second-stage rotors 20 and 22, respectively, and radially sliding vanes 24 within the rings 26 and 28. The pressure balanced vane pump rotor 20 is provided with inlet ports 30 and 32 connected to conduit 16 and outlet ports 34 and 36 connected to the intermediate conduit 38. Intermediate conduit 38 is connected to the pressure balanced inlet ports 40 and 42 of the second-stage pump 22. Outlet ports 44 and 46 of the second-stage pump are connected to the pressure discharge conduit 48.

The pressure dividing valve 12 is provided with two differential pistons, one a low-pressure large-area piston 50 and the other a high-pressure small-area piston 52 reciprocably mounted in a cylinder sleeve 54. The valve is mounted within the dividing valve housing 56 which is an integral part of the main pump housing 14.

The head of the high-pressure differential piston valve is connected by conduit 58 to the discharge conduit 48 and the low-pressure differential piston valve is in communication with the intermediate conduit 38 by means of conduit 60. Port 62 is connected to passage 64 which in turn connects to conduit 60 and the intermediate conduit 38. Port 66 connects the low pressure cylinder to a drain conduit 68 and to tank 18 when not blocked by piston 50.

In operation, hydraulic fluid is drawn from tank 18 to suction conduit 16 into the first-stage working chambers of rotor 20 through the inlet ports 30 and 32. It is discharged from the first-stage outlet ports 34 and 36 and is conducted through intermediate conduit 38 to the inlet ports 40 and 42 of the second stage. From the working chambers surrounding rotor 22, the pressure fluid is discharged through outlet ports 44 and 46 and is thereafter conducted to a hydraulic load device (not shown) through conduit 48.

In order to maintain the operating pressures of each stage in a predetermined ratio (for example, two to one) a pressure driving valve 12 is connected to conduits 38 and 48 by means of conduits 60 and 58, respectively, and is connected to tank by conduit 68.

When the relative pressure in intermediate low-pressure conduit 38 is above normal, it is transmitted through conduit 60 and passage 70 to low-pressure cylinder 72 where it shifts the pistons 50 and 52 to the left as shown in Figure 3. The shifting of piston 50 to the left uncovers port 66 and relieves the above normal pressure from conduit 38 to tank through passage 68.

When the pressure in conduit 38 is below normal, the prevailing differential pressure in discharge conduit 48 is transmitted to the high-pressure cylinder 74 which shifts the high-pressure piston 52 and piston 50 to the right as shown in Figure 4. The shifting of piston 52 to the right uncovers port 62 and bypasses pressure fluid through passage 64, groove 76, passage 70 and conduit 60 to intermediate conduit 38. When the differential pressure balance re-establishes itself, pistons 50 and 52 will be moved to a neutral position as indicated in Figure 1.

It is, therefore, evident that the pressures existing in conduits 38 and 48 will be maintained in direct proportion to the areas of the differential pistons 50 and 52. The operation of dividing valve 12 has been illustrated and described in conjunction with a two-stage pump. If conduits 38 and 40 were any two pressure chambers, the pressure could be divided between them in any predetermined proportion. As, for example, if the pressure relationship desired was four to one (as would be the case in the first stage of a four-stage pump) then the differential piston package consisting of the sleeve 54 and the pistons 50 and 52 would be provided with piston areas in the proportion of one to four.

The description above has dealt mainly with the application of the invention to multi-stage vane type pumps as illustrated in the drawing. The invention applies equally to multi-stage motors or to hydraulic pressure energy translating devices in general. When employed with motors in place of pumps or with motor-pump devices used as motors, the second stage of the pump becomes the first stage of the motor or the reverse. The intermediate conduits are identical but the inlets and outlets are interchanged as far as the high pressure and low pressure are concerned.

It will thus be seen that the present invention has provided a valve for maintaining pressures in related chambers at a constant proportion regardless of fluctuation. This is accomplished by employing a differential piston valve connected to the chambers for relieving excess pressure or introducing pressure fluid when the chamber pressure is below normal.

While the form of embodiment of the invention as herein disclosed constitutes a preferred form, it is to be understood that other forms might be adopted, all coming within the scope of the claims which follow.

What is claimed is as follows:

1. A pressure dividing valve for maintaining the pressure in a chamber at a fixed relative proportion of a supplied pressure comprising a cylinder with a differential piston valve reciprocably mounted therein, the relative differential areas of the piston being in inverse proportion to the pressures to be maintained in the chamber relative to the supply pressure, and means controlled by the movement of the pressure actuated piston valve for relieving the pressure in the chamber when it exceeds its relative proportion of the supply pressure or bleeding supply pressure fluid into the chamber when the chamber pressure is below its relative pressure.

2. A pressure dividing valve for maintaining the pressure in a chamber at a fixed relative proportion of a supplied pressure comprising a cylinder with a differential piston valve reciprocably mounted therein, the relative differential areas of the piston being in inverse proportion to the pressures to be maintained in the chamber relative to the supply pressure, passages connecting the larger of the differential piston cylinders to the chamber and to exhaust, respectively, in combination with means for interconnecting the passages when the chamber pressure is excessive, and passages connecting the smaller of the differential piston cylinders to the chamber and to the pressure fluid supply, respectively, in combination with means for interconnecting the passages when the chamber pressure is below its relative normal pressure.

3. A device for maintaining the pressure in a controlled chamber at a predetermined constant percentage of the pressure in a related chamber, including a differential piston valve provided with differential areas of equivalent constant percentage proportions, conduits connecting the larger area with lower pressure chamber and the smaller area with the other chamber, whereby the piston valve is normally pressure balanced, and means controlled by the movement of the piston valve for maintaining the pressure relationship constant during pressure fluctuations.

4. A device for maintaining the pressure in a controlled chamber at a predetermined constant percentage of the pressure in a related chamber, including a differential piston valve provided with differential areas of equivalent constant percentage proportions, conduits connecting the larger area with lower pressure chamber and the smaller area with the other chamber, whereby the piston valve is normally pressure balanced, and an exhaust port connected to the lower pressure chamber and opened by the piston valve when the pressure force on the larger area piston predominates over the total force on the smaller area piston.

5. A device for maintaining the pressure in a controlled chamber at a predetermined constant percentage of the pressure in a related chamber, including a differential piston valve provided with differential areas of equivalent constant percentage proportions, conduits connecting the larger area with lower pressure chamber and the smaller area with the other chamber, whereby the piston valve is normally pressure balanced, and a by-pass conduit connecting the higher pressure chamber to the lower pressure chamber and adapted to be opened by the piston valve when the pressure force on the smaller area piston predominates over the force on the larger area.

6. A device for maintaining the pressure in a controlled chamber at a predetermined constant percentage of the pressure in a related chamber, including a differential piston valve provided with differential areas of equivalent constant percentage proportions, conduits connecting the larger area with lower pressure chamber and the smaller area with the other chamber, whereby the piston valve is normally pressure balanced, an exhaust port connected to the lower pressure chamber and opened by the piston valve when the pressure force on the larger area piston predominates over the total force on the smaller area piston, and a by-pass conduit connecting the higher pressure chamber to the lower pressure chamber and adapted to be opened by the piston valve when the pressure force on the smaller area piston predominates over the force on the larger area.

7. A device for maintaining differential pressures in two related chambers at a fixed percentage of each other regardless of pressure fluctuations including a relief valve, and pressure controlled means actuated by the resultant force of the differential pressures and adapted to open the relief valve when the relative pressure in the lower pressure chamber predominates for relieving the relative excess pressure in that chamber and re-establish the differential pressure balance.

8. A device for maintaining differential pressures in two related chambers at a fixed percentage of each other regardless of pressure fluctuations including a passage connecting the two chambers, a by-pass valve located in said passage, and pressure controlled means actuated by the resultant force of the differential pressures and adapted to open the by-pass valve when the relative pressure in the lower pressure chamber is predominated by the relative pressure in the higher pressure chamber for by-passing pressure fluid from the high pressure chamber to the lower pressure chamber and re-establish the differential pressure balance.

9. A device for maintaining differential pressures in two related chambers at a fixed percentage of each other regardless of pressure fluctuations comprising means including differential piston relief and by-pass valves actuated by the resultant force of the differential pressures and adapted to open the relief valve when the relative pressure in the lower pressure chamber predominates for relieving the relative excess pressure in that chamber to open the by-pass valve when the relative pressure in the lower pressure chamber is predominated by the relative pressure in the higher pressure chamber for by-passing pressure fluid from the high pressure chamber to the lower pressure chamber and re-establish the differential pressure balance.

10. A pressure dividing valve for maintaining a proportionate pressure relationship between two chambers comprising a differential piston valve provided with differential areas of the same relative proportion as the differential pressure relationship to be maintained between the chambers, a passageway adapted to connect the pressure chambers and opened by the movement of the high pressure piston, and a passageway adapted to connect the low pressure chamber to tank and be opened by the movement of the low pressure piston.

11. A pressure dividing valve for maintaining a proportionate pressure relationship between two chambers comprising a differential piston valve provided with differential areas of the same relative proportion as the differential pressure relationship to be maintained between the chambers, said differential piston consisting of two independent piston elements abutting but detached and adapted to operate in concert under opposed pressures, a passageway adapted to connect the pressure chambers and opened by the movement of the high pressure piston, and a passageway adapted to connect the low pressure chamber to tank and be opened by the movement of the low pressure piston.

12. A multi-stage pump including means for maintaining the delivery pressure of the separate stages in proportional relationship, each stage after the first stage comprising a differential piston valve and cylinders, a passage in parallel with the higher-stage pump and controlled by the high pressure differential piston for bleeding high pressure fluid into the higher-stage pump inlet when the relative inlet pressure is low, and a passage in parallel with the lower-stage pump and controlled by the lower pressure differential piston for relieving excessive intermediate pressure in the circuit between the two stages.

13. A two-stage pump including means for maintaining equal pressure drops across each stage comprising branch parallel passages connecting the intermediate conduit between the outlet of the first-stage pump and the inlet of the second-stage pump to the tank and to the discharge passage, respectively, and pressure actuated means controlled by the relative pressure in the intermediate conduit for relieving excess pressure to tank or introducing discharge pressure fluid into the intermediate conduit and balancing the pressure drops.

14. A multi-stage pump including means for maintaining the delivery pressure of the separate stages in proportional relationship, each stage after the first comprising a first branch passage connecting the higher-stage pump to the inlet of the lower stage pump and a second branch passage connecting the inlet of the higher stage pump to the discharge thereof, and a pressure dividing valve including a differential piston valve controlled by the relative differential pressure between the inlet and discharge of the higher stage pump for relieving excess pressure through the first branch passage or introducing pressure fluid into the inlet of the higher stage pump through the second branch passage.

15. A two-stage pump employing a pressure dividing valve for maintaining equal pressure drops across each stage comprising a body member for housing both pump stages and the dividing valve including a differential piston valve and cylinders, a passage in parallel with the second-stage pump and controlled by the high pressure differential piston for bleeding high pressure fluid into the second-stage pump inlet when the relative inlet pressure is low, and a passage in parallel with the first-stage pump and controlled by the lower pressure differential piston for relieving excessive intermediate pressure in the circuit between the two stages.

16. A two-stage pump employing a pressure dividing valve for maintaining equal pressure drops across each stage, comprising a body member for housing both pump stages and the dividing valve, a packaged differential piston valve assembly including a replaceable cylinder sleeve and differential pistons reciprocably mounted therein and provided with predetermined selected differential areas for obtaining a predetermined relative pressure balance, a passage in parallel with the second-stage pump and controlled by the high pressure differential piston for bleeding high pressure fluid into the second-stage pump inlet when the relative inlet pressure is low, and a passage in parallel with the first-stage pump and controlled by the lower pressure differential piston for relieving excessive intermediate pressure in the circuit between the two stages.

17. A transmission employing multiple hydraulic pressure energy translating devices connected in series comprising a pressure dividing valve including pressure controlled means for directing higher pressure fluid into the intermediate conduit when the pressure in that intermediate conduit is below normal, and pressure controlled means for relieving excessive pressure fluid from an intermediate conduit when the pressure in that intermediate conduit is above normal and maintaining the operating pressures of each of the devices in a predetermined ratio.

JAMES ROBINSON.
CLIFFORD V. LOSEY.

REFERENCES CITED

The following references are of record in the file of this patent:

UNITED STATES PATENTS

| Number | Name | Date |
|---|---|---|
| 1,369,050 | Quick | Feb. 22, 1921 |
| 1,655,173 | Webber | Jan. 3, 1928 |
| 1,877,091 | Vickers | Sept. 13, 1932 |
| 1,972,560 | Heller | Sept. 4, 1934 |
| 2,291,033 | Goepfrich | July 28, 1942 |
| 2,327,942 | Thoreson | Aug. 24, 1943 |

FOREIGN PATENTS

| Number | Country | Date |
|---|---|---|
| 724,263 | France | Jan. 25, 1932 |